United States Patent Office 3,255,111
Patented June 7, 1966

3,255,111
LUBRICANT COMPOSITIONS CONTAINING PHOSPHONATE-OLEFIN ADDUCTS
Ellis K. Fields, Chicago, Ill., assignor to Standard Oil Company, Chicago, Ill., a corporation of Indiana
No Drawing. Original application Aug. 3, 1962, Ser. No. 214,485, now Patent No. 3,193,570, dated July 6, 1965. Divided and this application Apr. 17, 1964, Ser. No. 360,773
9 Claims. (Cl. 252—49.9)

This is a division of application Serial No. 214,485, filed August 2, 1962, now U.S. Patent 3,193,570.

This invention relates to new and useful compositions containing phosphorus and halogens and to a method of preparing same. More particularly, it relates to novel adducts of trihalomethylphosphonates and an olefin. Additionally, it relates to oleaginous compositions containing the compounds of this invention as an active ingredient.

It has been discovered that under free radical forming conditions, dialkyl trihalomethylphosphonates add to olefins to form novel adducts that contain phosphorus and halogens. These new reaction products range from an approximate 1:1 adduct of phosphonate:olefin to products containing multiple units of the olefin or phosphonate or combinations thereof that can in general be characterized as telomers. A 1:1 adduct is a product in which the total number of carbon, phosphorus, halogen, and oxygen atoms present is equal to the sum of such atoms present in the phosphonate and olefin from which said adduct was derived. Since the compounds of this invention are the reaction products of an olefin and a phosphonate reacted together under free radical forming conditions, the exact structure is extremely difficult to ascertain. Consequently, the compounds obtained in accordance with this invention are identified as adducts of trihalomethylphosphonates and olefins. These adducts are generally non-crystalline high boiling materials.

Normally, the phosphonate functions both as a reactant and as the reaction medium. However, an inert mutual solvent can be used as the medium for the reaction when so desired or when the ratio of the reactants is such that phosphonate is insufficient to function both as a reactant and solvent for the olefin. The inert solvent, when used, can be removed by any known and suitable means.

The compounds of this invention are prepared by reacting a dialkyl trihalophosphonate and an olefin in the presence of a free radical initiator at a temperature and for a time sufficient to form the adduct. The mole ratio of phosphonate to olefin can vary from 1:30 up to 10:1. Reaction temperatures and pressures will depend upon the reacting olefin and the decomposition temperature of the free radical initiator employed.

The reaction is effected under conditions which favor the formation of free radicals. The free radicals in turn serve as an initiator, or catalyst, for the principal reaction. As is already known, these radicals can be formed by exposure of the reactants to ultraviolet light, by the addition of a suitable peroxide, or by organic compounds capable of inducing free radical formation. Suitable free radical initiators are benzoyl peroxide, acetyl peroxide, di-tert-butyl peroxide, di-tert-butyl peroxybutane, azo-bis-isobutyronitrile, and ether peroxides. Since the means by which the reaction of this invention is catalyzed forms no part thereof and since techniques for effecting such conditions of catalysis are well known, they are referred to herein as free radical forming conditions. Ordinarily, if an organic compound or peroxide is used as the free radical former, it is employed in an amount of from about 0.01 to 10, preferably 0.1 to 5, mole percent of the total reactants. Where ultraviolet light is used, the known techniques for irradiating the reactants in liquid phase are utilized for free radical formation.

The temperature and pressure at which the reaction is carried out will in general vary with the olefin used. Ordinarily, it is preferred to operate at temperatures of from about 15° to 25° C. below the boiling point of the olefins up to its boiling point, or the reflux temperature of the reaction mixture. Generally, for the range of olefins contemplated, suitable temperatures can range from about 0° to about 250° C. at atmospheric pressure and pressure can range from 1 to 1,000 atmospheres. Normally, gaseous olefins are employed under conditions where they exist in the liquid state for effecting liquid phase operation.

The dialkyl trihalomethylphosphonate reactants have the formula $X_3C—P(O)(OR)_2$ wherein X is either chlorine, bromine, or mixtures thereof, and R is a $C_{2-20}$ alkyl radical such as methyl, ethyl, propyl, butyl, amyl, hexyl, octyl, dodecyl, hexadecyl, octadecyl, and eicosyl. These phosphonates, which are esters of trichloromethylphosphonic acid, are suitably prepared in known manner by reacting carbon tetrachloride, carbon tetrabromide, or bromotrichloromethane with the corresponding trialkyl esters of phosphorus acid such as triethyl phosphite. Illustrative phosphonates are the dimethyl, diethyl, dibutyl, dioctyl, didodecyl, and dioctadecyl trichloro-, tribromo-, bromodichloro-, and chlorodibromo-methylphosphonates.

The olefin reactant can be any hydrocarbon containing from 2 to 30 carbon atoms of the alkene, cycloalkene and aralkene hydrocarbon series. Such olefins can contain one or more ethylenic double bonds, that is, monoolefinic or polyolefinic hydrocarbons can be used having the carbon to carbon bonds in either internal or in terminal positions. Illustrative olefins are the terminal alkenes, $R—CH=CH_2$, wherein R is hydrogn or straight or branched chain $C_{2-18}$ alkyl groups; alkenes having one or more internal double bonds such as butene-2, butadiene, hexene-3, 2,6-octadiene, 9,10-octadecadiene, 2,14-tricosadiene, 7-methyl-1,3,7-nonatriene. Cycloalkenes include cyclobutene, cyclohexene, cyclooctadiene, 1,5,9-cyclododecatriene. The aralkenes, which can be mono- or polynuclear with one or more alkenyl substituents, include styrene, methylstyrene, divinylbenzene, butenylbenzene, vinylnaphthalene, and divinylbenzene, etc. Halogens can also be present as substituents in these olefins.

It has ben found that when the olefin is easily polymerizable with itself or with other polymerizable monomers under free radical reaction conditions to form hydrocarbon polymers or copolymers, that this invention provides a simple and expedient method of introducing phosphorus and a halogen into the polymer structure. Hydrocarbon polymers containing phosphorus and chlorine have superior fire resistance and fire retardancy properties. Consequently, by varying the ratios and type of olefin to phosphonates in the reaction, a wide range of products can be obtained. Long chain olefins yield adducts that have both detergent and extreme pressure properties in oleaginious materials such as lubricating oils. The phosphorus ester groups can also be hydrolyzed to form the corresponding phosphonic acids which are valuable per se as chemical intermediates. Such acids can form esters, salts, amides, etc. Telomers can be formed when the olefin is substantially in excess of the phosphonate or when the olefin is of the type that is easily polymerizable.

It will be apparent to one skilled in the art that other organic compounds such as acrylates and heterocyclic compounds containing ethylenic unsaturation are susceptible to reaction with the phosphonates used in this invention and thereby form addition compounds containing phosphorus and halogens in accordance with the method disclosed herein.

Illustrative embodiments of the invention are presented:

EXAMPLE 1

A mixture of 15.56 ml. (0.1 mole) 1-octene and 18.7 ml., 25.54 g., (0.1 mole) diethyl trichloromethylphosphonate (B.P. 99.5–101.5° at 1.5 mm., $n_D^{20}$ 1.4618, prepared according to G. Kosalopoff, J. Am. Chem. Soc., 69, 1002 (1947)) was refluxed for 2 hours. Initial pot temperature was 136.5° C., which did not change after 2 hours of refluxing. 0.1 ml. di-tert-butyl peroxide was then added and refluxing continued. After one hour the pot temperature was 141° C. After refluxing for an additional 16 hours, it reached 163° C.; and after 24 hours, 174° C. The flask contents were then distilled up to a pot temperature of 156° C. at 1 mm., leaving the reaction product as a viscous, clear brown residue weighing 24.3 g.

*Analysis.*—Calculated for $C_{13}H_{26}PO_3Cl_3$: C, 42.5%; H, 7.1%; P, 8.4%; Cl, 28.9%. Found: C, 39.5%; H, 7.0%; P, 9.4%; Cl, 27.0%.

A mixture of 5 g. of this product, 10 ml. ethanol, and 50 ml. concentrated hydrochloric acid was refluxed 24 hours, then evaporated on the steam bath. The residue, 4.7 g., was a waxy solid that readily dissolved in dilute base to give a strongly foaming solution.

*Analysis.*—C, 44.1%; H, 7.2%; P, 9.0%; Cl, 22.5%, acidity, 298 mg. KOH.

EXAMPLE 2

A mixture of 11.54 ml. (0.1 mole) freshly distilled styrene, 18.7 ml. (0.1 mole) diethyl trichloromethylphosphonate, and 0.2 ml. di-tert-butyl peroxide was heated at 150° C. for 5 hours. The mixture was stripped at 0.7 mm. up to a pot temperature of 160° C., recovering 13 ml. diethyl trichloromethylphosphonate and leaving 16.1 g. reaction product as a very viscous, light brown liquid, readily soluble in benzene and acetone.

*Analysis.*—Calculated for $C_{29}H_{34}PO_3Cl_3$ (corresponds to an adduct of 3 styrene molecules and 1 molecule of diethyl trichloromethylphosphonate), C, 61.4; H, 6.0; P, 5.8; Cl, 18.8. Found: C, 63.9; H, 6.1; P, 5.0; Cl, 14.4.

EXAMPLE 3

A mixture of 62.24 ml. (0.4 mole) 1-octene, 181.12 g. (0.8 mole) dimethyl trichloromethylphosphonate (B.P. 81–83° C. at 1.2 mm., $n_D^{20}$ 1.4703, $d_4^{20}$ 1.430, from carbon tetrachloride and trimethyl phosphite), and 0.2 ml. di-tert-butyl peroxide was refluxed. The initial pot temperature was 138° C.; it went up to 185° C. after 5 hours of refluxing. The pot contents were distilled up to a temperature of 185° C. at 0.4 mm., recovering 12.0 ml. 1-octene and 125 g. dimethyl trichloromethylphosphonate, leaving the reaction product, 59.7 g., as a clear, brown, viscous residue.

*Analysis.*—Calculated for $C_{11}H_{22}PO_3Cl_3$: C, 39.0; H, 6.5; P, 9.1; Cl, 31.3. Found: C, 42.0; H, 7.1; P, 8.8; Cl, 30.1.

EXAMPLE 4

A mixture of 28 ml. (0.2 mole) 1-heptene, 45.6 ml. (0.3 mole) dimethyl trichloromethylphosphonate, and 1 ml. di-tert-butyl peroxybutane was refluxed. The initial pot temperature was 107° C.; after 15 hours it was 190° C. The mixture was stripped at 0.6 mm. up to a pot temperature of 190° C., leaving the reaction product as a viscous, brown liquid residue, 35.8 g.

*Analysis.*—Calculated for $C_{10}H_{20}PO_3Cl_3$: C, 36.9; H, 6.1; P, 9.5; Cl, 32.7. Found: C, 39.6; H, 6.7; P, 9.8; Cl, 27.9.

EXAMPLE 5

A mixture of 25 ml. (0.2 mole) 1-hexene, 45.6 ml. (0.3 mole) dimethyl trichloromethylphosphonate, and 0.1 g. azo-bis-isobutyronitrile was refluxed. The initial pot temperature was 72° C. After 53 hours of refluxing the temperature rose to 108° C. The reaction mixture was distilled, giving the following fractions:

| Fraction | B.P., ° C. | Pressure, mm. | $n_D^{20}$ | Wt. in grams |
|---|---|---|---|---|
| 1 | 63–67 | 757 | 1.3827 | 4.85 |
| 2 | 67–108 | 0.45 | 1.4710 | 56 |
| 3 | 108–121 | 0.45 | 1.4720 | 0.7 |
| 4 | 136–139 | 0.5 | 1.4727 | 5.5 |
| 5 | 129–143 | 0.7 | 1.4762 | 2.1 |
| 6 | 145–170 | 0.7 | 1.4760 | 3.8 |

There were 2 g. residue.

Fraction 1 is recovered 1-hexene, fraction 2 is recovered dimethyl trichloromethylphosphonate.

*Analysis.*—Calculated for $C_9H_{18}PO_3Cl_3$: C, 34.7; H, 5.8; P, 9.9; Cl, 34.2; mol. wt., 311. Found: Fraction 4, C, 30.0; H, 5.1; P, 11.3; Cl, 31.5; mol. wt., 277±10. Found: Fraction 6; C, 36.5; H, 6.3; P, 9.7; Cl, 30.7; mol. wt. 326±10.

EXAMPLE 6

A mixture of 15.5 ml. (0.1 mole) alpha-pinene, 19.3 ml. (0.1 mole) diethyl trichloromethylphosphonate, and 0.73 g. di-tert-butyl peroxide was heated at 145° C. for 48 hours, then stripped at 0.35 mm. up to a pot temperature of 190° C., leaving the reaction product as a viscous, brown liquid, 15 g., having 10.1% P and 26.6% Cl.

The herein described phosphorus- and halogen-containing adducts of dialkyl trihalomethylphosphonate and an olefin are particularly suitable for use in amounts of from 0.01 to about 10% as addition agents for lubricating oils to impart extreme pressure properties to such lubricants.

Suitable lubricating base oils are hydrocarbon oils, e.g. petroleum oils, synthetic hydrocarbon lubricating oils such as those obtained by the polymerization of hydrocarbons, and other synthetic lubricating oils such as alkylene oxide type oils, for example, the "Ucon Oils" marketed by Carbide and Carbon Corporation, polycarboxylic acid ester-type oils such as esters of adipic acid, sebacic acid, azelaic acid, etc. and other synthetic lubricating oils.

Lubricating oils containing the herein described derivatives exhibit excellent extreme pressure properties as demonstrated by the data in Table I. The Almen values were determined on the Almen Tester in the manner described in the Proceedings of the 15th Annual Meeting American Petroleum Institute, 15, Sect. III, 60 (1934), or the Oil and Gas Journal 33, No. 26, 123, 126 (1934).

*Table I*

| Product | Concentration Percent [b] | Almen Test | |
|---|---|---|---|
| | | Pass (lbs.) | Fail (lbs.) |
| Control [a] | | 6 | 8 |
| Example 1 | 1 | 30+ | |
| | 0.25 | 30+ | |
| | 0.1 | 30+ | |
| | 0.05 | 16 | 18 |
| Example 3 | 1 | 30+ | |
| | 0.25 | 30+ | |
| | 0.1 | 24 | 26 |
| Example 4 | 1 | 30+ | |
| | 0.25 | 30+ | |
| | 0.1 | 30+ | |
| | 0.05 | 24 | 26 |
| Example 5 | 1 | 30+ | |
| | 0.25 | 30+ | |
| | 0.1 | 26 | 28 |
| Example 6 | 1 | 30+ | |
| | 0.25 | 30+ | |
| | 0.1 | 30+ | |
| | 0.05 | 14 | 16 |

[a] Solvent-extracted SAE 5W oil.
[b] Concentration of additive in the control oil.

The above data shows the ability of the compounds of this invention to impart considerable load-carrying properties to oil in low concentrations.

While this invention has been described in connection with the use of the herein described additives and lubricant compositions, their use is not limited thereto but the same can be used in products other than lubricating oils, such as for example, fuel oils, insulating oils, greases, non-drying animal and vegetable oils, waxes, and asphalts.

Concentrates of a suitable oil base containing more than 10%, e.g., from about 15% to about 50% or more, of the herein described derivatives, alone, or in combination with more than 10% of other additives, can be used for blending with other oils in proportions desired for the particular condition or use to give a finished product containing from about 0.01 to about 10% of the described derivative.

Lubricant composition containing the herein described derivatives can contain other addition agents such as, for example, antioxidants, pour point depressors, V.I. improvers, etc.

Unless otherwise stated, percentages given herein and in the appended claims are weight percentages.

Thus having described the invention, what is claimed is:

1. A lubricant composition comprising a major proportion of a lubricating oil and from about 0.01 to about 10% of the phosphorus- and halogen-containing adduct of (A) a dialkyl trihalomethylphosphonate having the formula $X_3C-P(O)(OR)_2$ wherein X is a member of the group consisting of chlorine and bromine, and R is a $C_{1-20}$ alkyl radical; and (B) an olefin containing from 2 to about 30 carbon atoms of the group consisting of alkene, cycloalkene and aralkene hydrocarbons, said adduct obtained by reacting said phosphonate and said olefin in a molar ratio of from 1:30 to 10:1 in the presence of a free radical initiator.

2. The composition of claim 1 wherein said lubricating oil is a hydrocarbon lubricating oil.

3. A lubricant composition comprising a major proportion of a hydrocarbon lubricating oil and from about 0.01 to about 10% of the phosphorus- and halogen-containing adduct of (A) diethyl trichloromethylphosphonate and (B) octene-1 obtained by heating an equimolar mixture of A and B in the presence of di-tert-butyl peroxide at a temperature of from about 140° to about 175° C. for about 24 hours.

4. A lubricant composition comprising a major proportion of a hydrocarbon lubricating oil and from about 0.01 to about 10% of the phosphorus- and halogen-containing adduct of (A) diethyl trichloromethylphosphonate and (B) styrene obtained by heating an equimolar mixture of A and B in the presence of di-tert-butyl peroxide at a temperature of about 150° C. for about 5 hours.

5. A lubricant composition comprising a major proportion of a hydrocarbon lubricating oil and from about 0.01 to about 10% of the phosphorus- and halogen-containing adduct of (A) diethyl trichloromethylphosphonate and (B) alpha-pinene obtained by heating an equimolar mixture of A and B in the presence of di-tert-butyl peroxide at a temperature of about 145° C. for about 48 hours.

6. A lubricant composition comprising a major proportion of a hydrocarbon lubricating oil and from about 0.01 to about 10% of the phosphorus- and halogen-containing adduct of (A) dimethyl trichloromethylphosphonate and (B) heptene-1 obtained by heating about 3 moles of A and about 2 moles of B in the presence of di-tert-butylperoxybutane at a temperature of from about 105° to about 190° C. for about 15 hours.

7. A lubricant composition comprising a major proportion of a hydrocarbon lubricating oil and from about 0.01 to about 10% of the phosphorus- and halogen-containing adduct of (A) dimethyl trichloromethylphosphonate and (B) hexene-1 obtained by heating about 3 moles of A and about 2 moles of B in the presence of azobis-isobutyronitrile at a temperature of from about 70° to about 110° C. for about 53 hours.

8. An addition agent concentrate for lubricating oils consisting essentially of a lubricating oil containing more than 10% and up to about 50% of a phosphorus- and halogen-containing adduct of (A) a dialkyl trihalomethylphosphonate having the formula $X_3C-P(O)(OR)_2$ wherein X is a member of the group consisting of chlorine and bromine, and R is a $C_{1-20}$ alkyl radical; and (B) an olefin containing from 2 to about 30 carbon atoms of the group consisting of alkene, cycloalkene and aralkene hydrocarbons, said adduct obtained by reacting said phosphonate and said olefin in a molar ratio of from 1:30 to 10:1 in the presence of a free radical initiator.

9. The composition of claim 1 wherein said lubricating oil is petroleum lubricating oil.

References Cited by the Examiner

UNITED STATES PATENTS

| | | | |
|---|---|---|---|
| 2,478,390 | 8/1949 | Hanford et al. | 260—461 |
| 2,573,568 | 10/1951 | Harman et al. | 252—49.9 |
| 2,957,931 | 10/1960 | Hamilton et al. | 252—49.8 |

DANIEL E. WYMAN, *Primary Examiner.*

L. G. XIARHOS, *Assistant Examiner.*